(12) United States Patent
Nakatsuji et al.

(10) Patent No.: US 7,585,477 B2
(45) Date of Patent: *Sep. 8, 2009

(54) CATALYST AND METHOD FOR CATALYTIC REDUCTION OF NITROGEN OXIDES

(75) Inventors: Tadao Nakatsuji, Kashiba (JP); Norio Suzuki, Wako (JP); Hiroshi Ohno, Wako (JP); Naohiro Sato, Wako (JP); Tomoko Morita, Wako (JP); Katsuji Wada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 167 days.

This patent is subject to a terminal disclaimer.

(21) Appl. No.: 10/578,664

(22) PCT Filed: Nov. 8, 2004

(86) PCT No.: PCT/JP2004/016910

§ 371 (c)(1),
(2), (4) Date: Apr. 11, 2007

(87) PCT Pub. No.: WO2005/044426

PCT Pub. Date: May 19, 2005

(65) Prior Publication Data

US 2007/0274889 A1 Nov. 29, 2007

(30) Foreign Application Priority Data

Nov. 11, 2003 (JP) ............................. 2003-380838

(51) Int. Cl.
- *B01D 53/56* (2006.01)
- *B01D 53/94* (2006.01)
- *B01J 23/00* (2006.01)
- *B01J 23/10* (2006.01)
- *B01J 23/16* (2006.01)
- *B01J 23/38* (2006.01)

(52) U.S. Cl. .............. 423/213.2; 423/213.5; 423/239.1; 423/239.2; 502/300; 502/302; 502/304; 502/349; 502/325; 502/305; 502/344; 502/353; 502/324; 502/527.12; 502/527.13

(58) Field of Classification Search .............. 423/213.2, 423/213.5, 239.1, 239.2; 502/300, 302, 304, 502/349, 325, 305, 344, 353, 324, 527.12, 502/527.13

See application file for complete search history.

(56) References Cited

U.S. PATENT DOCUMENTS

| 5,733,837 | A | * | 3/1998 | Nakatsuji et al. ............. 502/304 |
| 5,795,840 | A | | 8/1998 | Takami et al. |
| 6,045,765 | A | * | 4/2000 | Nakatsuji et al. ......... 423/239.1 |
| 6,120,746 | A | | 9/2000 | Takemoto et al. |
| 6,413,483 | B1 | | 7/2002 | Brisley et al. |
| 2002/0016259 | A1 | * | 2/2002 | Yoshikawa .................. 502/324 |
| 2004/0043897 | A1 | | 3/2004 | Tadao |

FOREIGN PATENT DOCUMENTS

| JP | 4-365920 | 12/1992 |
| JP | 7-68180 | 3/1995 |
| JP | 7-144133 | 6/1995 |
| JP | 7-213911 | 8/1995 |
| JP | 9-10594 | 1/1997 |
| JP | 11-226414 | 8/1999 |
| JP | 2000-154713 | 6/2000 |
| JP | 2001-113172 | 4/2001 |
| JP | 2001-149758 | 6/2001 |
| JP | 2002-506500 | 2/2002 |

* cited by examiner

*Primary Examiner*—Timothy C Vanoy
(74) *Attorney, Agent, or Firm*—Wenderoth, Lind & Ponack, L.L.P.

(57) ABSTRACT

The invention provides a catalyst for catalytic reduction of nitrogen oxides contained in exhaust gases wherein fuel is supplied and subjected to combustion under periodic rich/lean conditions and the resulting exhaust gases are brought into contact therewith, which catalyst comprises: (A) a catalyst component A comprising (c) ceria or (d) praseodymium oxide or (e) an oxide and/or a composite oxide of at least two elements selected from the group consisting of cerium, zirconium, praseodymium, neodymium, terbium, samarium, gadolinium and lanthanum; (B) a catalyst component B comprising (d) a noble metal catalyst component selected from the group consisting of platinum, rhodium, palladium and oxides thereof and (e) a carrier; and (C) a catalyst component C comprising (f) a solid acid, and (g) a solid acid supporting an oxide of at least one element selected from the group consisting of vanadium, tungsten, molybdenum, copper, iron, cobalt, nickel and manganese.

24 Claims, 2 Drawing Sheets

CATALYST AND METHOD FOR CATALYTIC REDUCTION OF NITROGEN OXIDES

TECHNICAL FIELD

The invention relates to a method for catalytic reduction of nitrogen oxides (which mainly comprises NO and $NO_2$, and will be referred to as NOx hereunder). More particularly, the invention relates to a method for reduction of NOx contained in exhaust gases wherein fuel is supplied to a combustion chamber of a diesel engine or a gasoline engine and subjected to combustion with periodic rich/lean excursions and the resulting exhaust gases are brought into contact with a catalyst, and a catalyst used in such a method. This method and the catalyst used therein are suitable for reducing and removing harmful nitrogen oxides contained in exhaust gases, e.g., from engines of automobiles.

In particular, the invention relates to a method and a catalyst for catalytic reduction of NOx contained in exhaust gases in the presence of sulfur oxides (which mainly comprises $SO_2$ and $SO_3$, and will be referred to as SOx hereunder) with no deterioration of catalyst wherein fuel is supplied and subjected to combustion with periodic rich/lean excursions whereby NOx is generated in the exhaust gases.

In the invention, by the term "excursion" is meant a movement or such operations of air/fuel ratio outward and back from a mean value thereof along a time axis. By the term "rich" is meant an air/fuel ratio smaller than the stoichiometric air/fuel ratio of the fuel in question, while by the term "lean" is meant an air/fuel ratio larger than the stoichiometric air/fuel ratio of the fuel in question. For normal automobile gasoline, the stoichiometric air/fuel ratio is approximately 14.5. Further, the term "catalyst" includes a catalyst itself as well as a catalyst structure which contains the catalyst and works to remove NOx during rich/lean combustion of fuel.

Accordingly, by the term "supplying fuel with periodic rich/lean excursions" is especially meant that fuel is supplied, injected or jetted to a combustion chamber of a diesel engine or a gasoline engine, and is subjected to combustion mainly under the lean conditions (wherein the oxygen concentration in the exhaust gases after combustion of fuel is typically in a range of approximately 5% to 10%) while air/fuel ratio is so adjusted that the combustion atmosphere of fuel is periodically oscillated between the rich conditions and lean conditions. Therefore, "the rich/lean excursions" has the same meaning as "the rich/lean conditions".

BACKGROUND ART

NOx contained in exhaust gases has conventionally been removed by, for example, a method in which the NOx is oxidized and then absorbed in an alkaline solution or a method in which the NOx is reduced to nitrogen by using a reducing agent such as ammonia, hydrogen, carbon monoxide or hydrocarbons. However, these conventional methods have their own disadvantages.

That is, the former method requires a means for handling the resulting alkaline waste liquid to prevent environmental pollution. The latter method, for example, when it uses ammonia as a reducing agent, involves the problem that ammonia reacts with SOx in the exhaust gases to form salts, resulting in a deterioration in catalytic activity at low temperatures. Accordingly, when NOx from moving sources such as automobiles is to be treated, the safety is a question.

On the other hand, when hydrogen, carbon monoxide or hydrocarbons are used as a reducing agent, the reducing agent reacts preferentially with oxygen since the waste gas contains oxygen in a higher concentration than NOx. This means that substantial reduction of NOx needs a large quantity of a reducing agent, and hence resulting in remarkable fall of fuel efficiency.

It has been therefore proposed to catalytically decompose NOx in the absence of a reducing agent. However, the catalysts that have been conventionally known for direct decomposition of NOx have not yet been put to practical use due to their low decomposition activity. On the other hand, a variety of zeolites have been proposed as a catalyst for the catalytic reduction of NOx using a hydrocarbon or an oxygen-containing organic compound as a reducing agent. In particular, Cu-ion exchanged ZSM-5 or H type (hydrogen type or acid type) zeolite ZSM-5 ($SiO_2/Al_2O_3$ molar ratio=30 to 40) has been regarded as optimal. However, it has been found that even the H type zeolite has no sufficient reduction activity, and particularly the zeolite catalyst is rapidly deactivated on account of dealumination of the zeolite structure when water is contained in the exhaust gas.

Under these circumstances, it has been necessary to develop a more active catalyst for the catalytic reduction of NOx. Accordingly, a catalyst composed of an inorganic oxide carrier material having silver or silver oxide supported thereon has recently been proposed, as described in EP-A1-526099 or EP-A1-679427. However, it has been found that the catalyst has a high activity for oxidation, but a low activity for selective reduction of NOx, so that the catalyst has a low conversion rate of nitrogen oxides to nitrogen. In addition, the catalyst involves a problem that it is deactivated rapidly in the presence of sulfur oxides. The catalyst catalyzes the selective reduction of NOx with hydrocarbons under full lean conditions, but it has a lower NOx conversion and a more narrow temperature window (temperature range) than the known three way catalyst. This makes it difficult for such lean NOx catalysts to be practically used. Thus, there has been a demand for developing a more heat-resistant and more active catalyst or catalytic system for the catalytic reduction of nitrogen oxides.

In order to overcome the above-mentioned problems, a NOx storage-reduction system has recently been proposed as one of the most promising methods, as described in WO 93/7363 or WO 93/8383. In the proposed system, fuel is periodically spiked for a short moment to a combustion chamber in excess of the stoichiometric amount. Vehicles with lean burn engines can be driven at lower fuel consumption rates than conventional vehicles. It is because such vehicles can be driven at a much lower fuel/air ratio than the conventional vehicles. This NOx storage-reduction system for lean burn engines reduces NOx in two periodic steps at intervals of one to two minutes.

That is, in the first step, NO is oxidized to $NO_2$ on a platinum or rhodium catalyst under (normal) lean conditions, and the $NO_2$ is absorbed in an absorbent comprising such an alkali compound as potassium carbonate or barium carbonate. Subsequently, rich conditions are formed for the second step, and the rich conditions are maintained for several seconds. Under the rich conditions, the absorbed (or stored) $NO_2$ is desorbed from the absorbent and is efficiently reduced to nitrogen with hydrocarbons, carbon monoxide or hydrogen on the platinum or rhodium catalyst. This NOx storage-reduction system works well over a long period of time in the absence of SOx. However, there is a problem that in the presence of SOx, the catalytic system deteriorates drastically due to the irreversible absorption of SOx at $NO_2$ absorption sites on the alkali compound under either the lean or the rich conditions.

Accordingly, for the purpose of betraying the weak point or solving the problem in that the NOx storage-reduction system deteriorates in performance in the presence of SOx, there has been recently proposed in WO 02/8997 such a catalyst that has a purification ability close to the NOx storage-reduction system and a high SOx durability. The catalyst comprises (A) an outer catalyst layer comprising an outer catalyst component, wherein the outer catalyst component comprises
   (a) ceria or;
   (b) praseodymium oxide or;
   (c) at least one selected from the group consisting of a mixture of oxides of at least two elements and a composite oxide of at least two elements, the elements being selected from the group consisting of cerium, zirconium, praseodymium, neodymium, gadolinium and lanthanum; and
(B) an inner catalyst layer comprising an inner catalyst component, wherein the inner catalyst component
   (d) at least one selected from the group consisting of platinum, rhodium, palladium and oxides thereof; and
   (e) a carrier.

Further, there has been proposed in WO 02/22255 such a catalyst that has a high SOx durability, which comprises an outer catalyst layer comprising a first catalyst component selected from rhodium, palladium and oxides thereof and a second catalyst component selected from zirconia, cerium oxide, praseodymium oxide, neodymium oxide and mixtures thereof, and an inner catalyst layer comprising a third catalyst component selected from rhodium, palladium, platinum and oxides thereof.

DISCLOSURE OF THE INVENTION

It is an object of the invention to provide a method for catalytic reduction of NOx contained in exhaust gases wherein fuel is supplied and subjected to combustion with a periodic rich/lean excursions, whereby NOx is generated in the exhaust gases, with high durability in a wide temperature range even in the presence of oxygen, sulfur oxides or water, as well as a catalyst used in the method.

In particular, it is an object of the invention to provide a highly durable catalyst for catalytic reduction of NOx in the lean excursion of periodic rich/lean combustion of fuel at a broad temperature range with no deterioration in the presence of oxygen, sulfur oxides or water, especially in the presence of sulfur oxides which brings about serious problem to the NOx storage catalyst and no generation of harmful ammonia in the rich excursion.

It is a further object of the invention to provide a catalyst structure for catalytic reduction of NOx which comprises the catalyst supported on an inactive substrate.

The invention provides a method for catalytic reduction of nitrogen oxides contained in exhaust gases wherein fuel is supplied and subjected to combustion under periodic rich/lean conditions and the resulting exhaust gases are brought into contact with a catalyst, which catalyst comprises:

(A) a catalyst component A which comprises
   (c) ceria or
   (d) praseodymium oxide or
   (e) an oxide and/or a composite oxide of at least two elements selected from the group consisting of cerium, zirconium, praseodymium, neodymium, terbium, samarium, gadolinium and lanthanum;

(B) a catalyst component B which comprises
   (d) a noble metal catalyst component selected from the group consisting of platinum, rhodium, palladium and oxides thereof and
   (e) a carrier; and
(C) a catalyst component C which comprises
   (f) a solid acid, and
   (g) a solid acid supporting an oxide of at least one element selected from the group consisting of vanadium, tungsten, molybdenum, copper, iron, cobalt, nickel and manganese.

The above catalyst used in the method mentioned above is hereunder referred to as a single layer catalyst.

According to a preferred embodiment of the invention, the invention provides a method for catalytic reduction of nitrogen oxides contained in exhaust gases wherein fuel is supplied and subjected to combustion under periodic rich/lean conditions and the resulting exhaust gases are brought into contact with a catalyst, which catalyst comprises:

an outer catalyst layer comprising a catalyst component A and a catalyst component C, as an outer catalyst component, wherein the catalyst component A comprises
(A) (a) ceria or
   (b) praseodymium oxide or
   (c) an oxide and/or a composite oxide of at least two elements selected from the group consisting of cerium, zirconium, praseodymium, neodymium, terbium, samarium, gadolinium and lanthanum; and the catalyst component C comprises
(C) (f) a solid acid, and
   (g) a solid acid supporting an oxide of at least one element selected from the group consisting of vanadium, tungsten, molybdenum, copper, iron, cobalt, nickel and manganese; and an inner catalyst layer comprising a catalyst component B, as an inner catalyst component, wherein the catalyst component B comprises
(B) (d) a noble metal catalyst component selected from the group consisting of platinum, rhodium, palladium and oxides thereof and
   (e) a carrier.

The above catalyst used in the method mentioned above is hereunder referred to as a first two layer catalyst.

In the single layer catalyst and the first two layer catalyst mentioned above, it is preferred according to the invention, in particular, that the catalyst component A is such that it supports a noble metal catalyst component selected from the group consisting of platinum, rhodium, palladium and oxides thereof.

According to a further preferred embodiment of the invention, the invention provides a method for catalytic reduction of nitrogen oxides contained in exhaust gases wherein fuel is supplied and subjected to combustion under periodic rich/lean conditions and the resulting exhaust gases are brought into contact with a catalyst, which catalyst comprises:

an outer catalyst layer comprising a catalyst component A and a catalyst component C, as an outer catalyst component, wherein the catalyst component A comprises
(A) (a) ceria or
   (b) praseodymium oxide or
   (c) an oxide and/or a composite oxide of at least two elements selected from the group consisting of cerium, zirconium, praseodymium, neodymium, terbium, samarium, gadolinium and lanthanum; and the catalyst component C comprises (C) (f) a solid acid, and (g) a solid acid supporting an oxide of at least one element selected from the group consisting of vanadium, tungsten, molybdenum, copper, iron, cobalt, nickel and manganese; and an inner catalyst layer comprising a catalyst component A and a catalyst component C, as an inner catalyst component, wherein the catalyst component A comprises (A) (a) ceria or (b) praseodymium oxide or (c) an oxide and/or a composite oxide of at least two elements selected from the group consisting of cerium, zirconium, praseodymium, neodymium, terbium, samarium, gadolinium and lanthanum; and the catalyst component B comprises (B) (d) a noble metal catalyst component selected from the group consisting of platinum, rhodium, palladium and oxides thereof and (e) a carrier.

The above catalyst used in the method mentioned above is hereunder referred to as a second two layer catalyst.

In the second two layer catalyst mentioned above, it is preferred according to the invention, in particular, that at least one of the catalyst component A in the outer catalyst component and the catalyst component A in the inner catalyst component is such that it supports thereon at least one noble metal catalyst component selected from the group consisting of platinum, rhodium, palladium and oxides thereof.

As a further aspect of the invention, the invention provides a catalyst for catalytic reduction of nitrogen oxides contained in exhaust gases wherein fuel is supplied and subjected to combustion under periodic rich/lean conditions and the resulting exhaust gases are brought into contact therewith, which catalyst is mentioned above.

As a most preferred embodiment of the invention, the invention provides a method for catalytic reduction of nitrogen oxides contained in exhaust gases wherein fuel is supplied and subjected to combustion under periodic rich/lean conditions and the resulting exhaust gases are brought into contact with a catalyst structure, which catalyst structure comprises an inactive substrate and the catalyst mentioned above supported on the substrate.

Further, the invention provides a catalyst structure for catalytic reduction of nitrogen oxides contained in exhaust gases wherein fuel is supplied and subjected to combustion under periodic rich/lean conditions and the resulting exhaust gases are brought into contact therewith, which catalyst structure comprises an inactive substrate and the catalyst mentioned above supported on the substrate.

BEST MODE FOR CARRYING OUT THE INVENTION

Herein the invention, the catalytic reduction of nitrogen oxides means that NOx adsorbed on a catalyst under the lean conditions is converted to ammonia by a catalytic reaction under the rich conditions, and this ammonia is stored on a solid acid in the catalyst, and then the ammonia stored in this way reacts with NOx in the presence of oxygen under the lean conditions, thereby NOx is converted to nitrogen, water, carbon monoxide and carbon dioxide among others in high efficiency over the entire lean/rich excursions.

Figure 1:
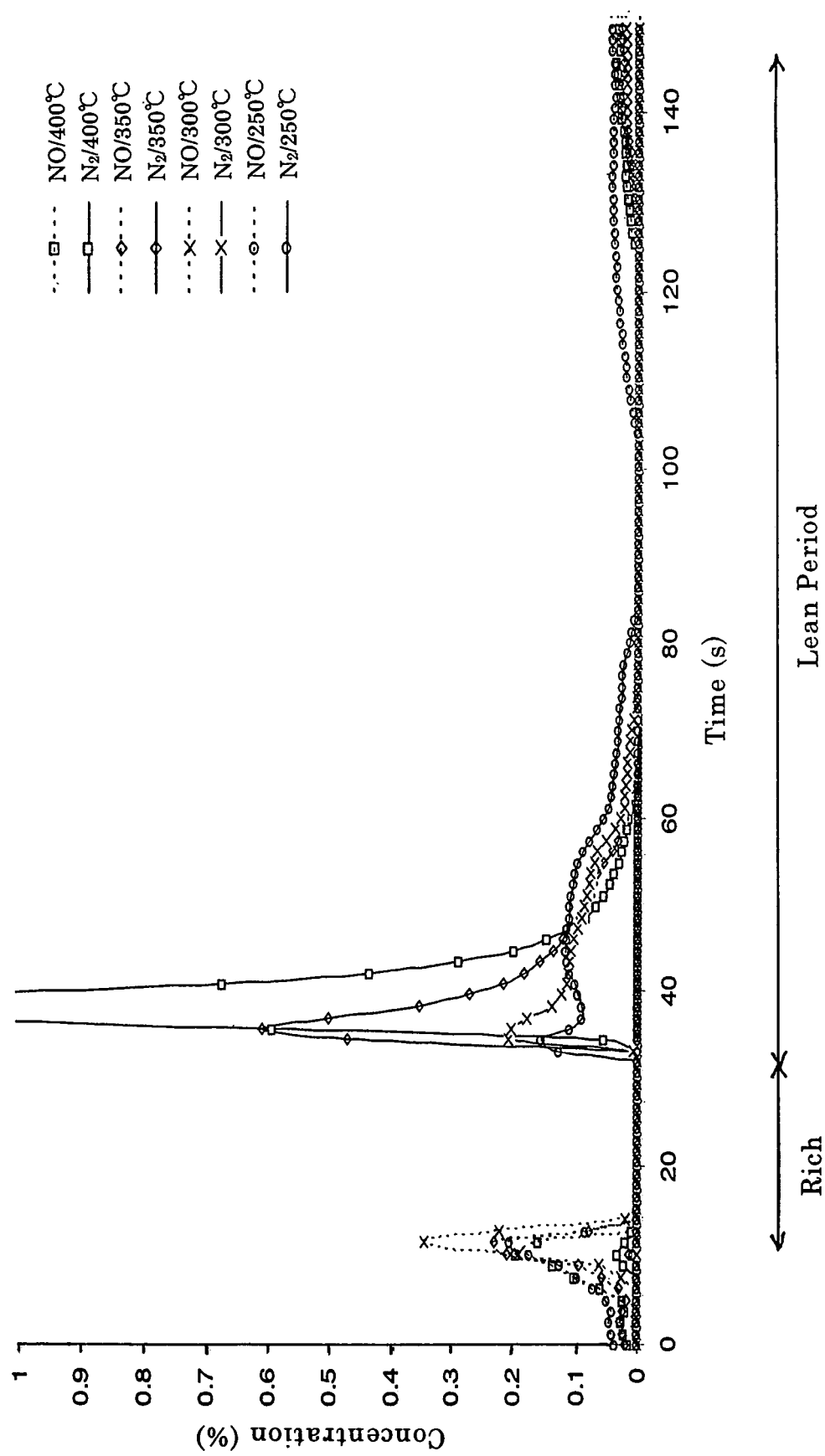
FIG. 1 is a graph showing changes of the concentration of nitrogen oxides and nitrogen in the resulting gases with time (rich/lean time) when exhaust gases are treated with an example of the catalysts of the invention at a reaction temperature in the range of 250 to 400° C.
Figure 2:
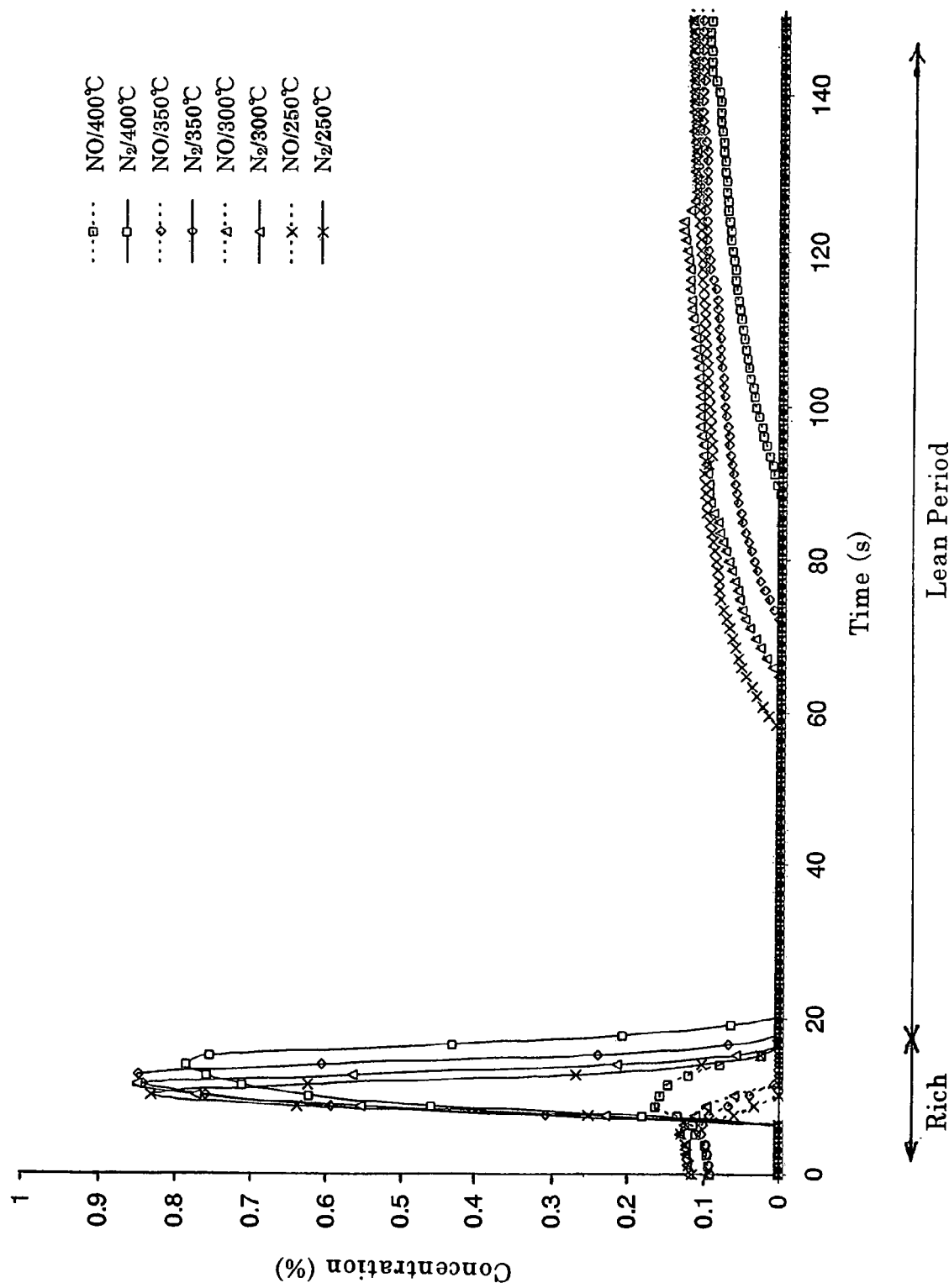
FIG. 2 is a graph showing changes of the concentration of nitrogen oxides and nitrogen in the resulting gases with time (rich/lean time) when exhaust gases are treated with an example of the catalysts of comparative examples at a reaction temperature in the range of 250 to 400° C.

In the NOx storage-reduction system described in WO 93/7363 and WO 93/8383 mentioned hereinbefore, NOx is absorbed on a basic material such as an alkaline compound and the thus absorbed NOx is reduced with a reducing agent such as hydrogen, carbon monoxide or hydrocarbon under the rich conditions to generate nitrogen, and consequently, the generation of nitrogen is observed only under the rich conditions, as shown in FIG. 2. In contrast, in the method of the invention, nitrogen is generated only under the lean condition, as shown in FIG. 1. This is because ammonia generated on the catalyst under the rich conditions is adsorbed on a solid acid catalyst component in the catalyst, and the ammonia adsorbed on the solid acid catalyst component in this way reduces NOx selectively to nitrogen only under the lean conditions. Therefore, according to the method of the invention, NOx is purified by a reaction that is different in mechanism from the previously described NOx storage-reduction system in which nitrogen is generated only under the rich conditions.

The reaction of selective reduction of NOx with ammonia in the presence of oxygen is shown by the equation below:

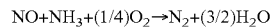

$$NO + NH_3 + (1/4)O_2 \rightarrow N_2 + (3/2)H_2O$$

Accordingly, if 50% of NOx present in exhaust gases is converted to ammonia, all the NOx in the exhaust gases is converted to nitrogen.

A first catalyst of the invention for catalytic reduction of nitrogen oxides contained exhaust gases wherein fuel is supplied and subjected to combustion under periodic rich/lean conditions and the resulting exhaust gases are brought into contact therewith comprises:

(A) a catalyst component A which comprises (c) ceria or (d) praseodymium oxide or (e) an oxide and/or a composite oxide of at least two elements selected from the group consisting of cerium, zirconium, praseodymium, neodymium, terbium, samarium, gadolinium and lanthanum;

(B) a catalyst component B which comprises (d) a noble metal catalyst component selected from the group consisting of platinum, rhodium, palladium and oxides thereof and (e) a carrier; and (C) a catalyst component C which comprises (f) a solid acid, and (g) a solid acid supporting an oxide of at least one element selected from the group consisting of vanadium, tungsten, molybdenum, copper, iron, cobalt, nickel and manganese. Thus, the first catalyst of the invention is a single layer catalyst.

In the invention, the catalyst component A is often referred to as a material capable of storing oxygen by noting that it has a function to store oxygen.

According to the catalyst of the invention, it is preferred that the amount of the catalyst component A is in the range of 30-70% by weight, the amount of the catalyst component B is in the range of 20-50% by weight, and the amount of the catalyst component C is in the range of 10-25% by weight, each based on the weight of all the catalyst components. In addition, it is preferred that the catalyst component B comprises 0.5-5% by weight of the noble metal catalyst component and 95-99.5% by weight of the carrier.

As the catalyst component A is mentioned as the component (c) as one of the embodiments, it may be a mixture of oxides of at least two of the elements and/or a composite oxide (solid solution) of at least two of the elements, that is, it may be at least one selected from the group consisting of a mixture of oxides of at least two of the elements and a composite oxide (solid solution) of at least two of the elements, and it is preferred that the mixture is a uniform mixture. However, a composite oxide of at least two of the elements is more preferably used than a mixture of oxide of at least two of the elements. In particular, a binary or ternary composite oxide is preferred.

In the case of a binary composite oxide, for example, ceria/praseodymium oxide composite oxide, ceria/zirconia composite oxide, ceria/terbium oxide composite oxide or ceria/samarium oxide composite oxide, the weight ratio in terms of oxides of the elements in the composite oxide is preferably in the range of 80/20 to 60/40. In turn, in the case of a ternary composite oxide, for example, ceria/gadolinium oxide/zirconia composite oxide, ceria/neodymium oxide/zirconia composite oxide, ceria/zirconia/praseodymium oxide composite oxide, ceria/zirconia/lanthanum oxide composite oxide, ceria/zirconia/samarium oxide composite oxide, or ceria/zirconia/terbium oxide composite oxide, the weight ratio in terms of oxides of the elements in the composite oxide is preferably in the range of 45/30/30 to 75/20/5. The weight ratio in terms of oxides in the composite oxides is calculated provided that ceria, zirconia, terbium oxides, praseodymium oxide, gadolinium oxides, neodymium oxide, samarium oxides and lanthanum oxides are represented by $CeO_2$, $ZrO_2$, $TbO_2$, $Pr_6O_{11}$, $Ga_2O_3$, $Nd_2O_3$, $Sm_2O_3$ and $La_2O_3$, respectively.

The catalyst component A in the catalyst of the invention can be prepared by a following method, for example. At first, a water soluble salt of an element constituting the catalyst component A, such as a nitrate, is neutralized or heated and hydrolyzed, to form a hydroxide, and the hydroxide is calcined at a temperature of 300-900° C. in an oxidative or a reductive atmosphere. However, the catalyst component A may be obtained by calcining a hydroxide or an oxide of the element available in the market.

Acid type zeolite such as H-Y zeolite, H-mordenite, H-β zeolite or H-ZSM-5, or titania, zirconia or silica-alumina is used as the solid acid of the catalyst component C. Among these solid acids, H-mordenite is most preferred from the viewpoint of ammonia adsorption ability. The acid solid supporting a metallic oxide is a catalyst component in which the solid acid as mentioned above supports at least one oxide of a metal selected from the group consisting of vanadium, tungsten, molybdenum, copper, iron, cobalt, nickel and manganese. The metallic oxide supported on the solid acid is suitably selected depending upon the reaction temperature at which exhaust gases are treated. When the reaction temperature is in the range of 200-300° C., oxides of vanadium or copper are preferably used, while when the reaction temperature is not less than 300° C., oxides of tungsten, molybdenum, iron, cobalt, nickel or manganese are preferably used. The use of a mixture of solid acid catalyst components supporting various kinds of metallic oxides provides a catalyst effective in a wider temperature range. The catalyst component comprising the solid acid supporting metallic oxides can be prepared by any of the hitherto known methods for supporting metallic oxides such as an impregnation method, an ion exchange method or a kneading method.

The amount of metallic oxide supported on a solid acid is in the range of 0.1-10% by weight based on the total weight of the solid acid and the metallic oxide. When the amount of metallic oxide supported on a solid acid is less than 0.1% by weight, the selective reduction of NOx with ammonia under the lean conditions takes place insufficiently, and when the amount of metallic oxide supported on solid acid is more than 10% by weight, reoxidation of ammonia takes place so that the resulting NOx conversion falls.

It is particularly preferred that the catalyst of the invention is a two layer catalyst that has an outer catalyst layer and an inner catalyst layer wherein the outer catalyst layer is exposed so as to contact directly with exhaust gases.

A first two layer catalyst of the invention comprises:

an outer catalyst layer comprising a catalyst component A and a catalyst component C, as an outer catalyst component, wherein the catalyst component A comprises (A) (a) ceria or (b) praseodymium oxide or (c) an oxide and/or a composite oxide of at least two elements selected from the group consisting of cerium, zirconium, praseodymium, neodymium, terbium, samarium, gadolinium and lanthanum; and the catalyst component C comprises (C) (f) a solid acid, and (g) a solid acid supporting an oxide of at least one element selected from the group consisting of vanadium, tungsten, molybdenum, copper, iron, cobalt, nickel and manganese; and an inner catalyst layer comprising a catalyst component B, as an inner catalyst component, wherein the catalyst component B comprises (B) (d) a noble metal catalyst component selected from the group consisting of platinum, rhodium, palladium and oxides thereof and (e) a carrier.

In the first two layer catalyst of the invention, the outer catalyst component of the outer catalyst layer comprises the catalyst component A and the catalyst component C, and the inner catalyst component of the inner catalyst layer comprises the catalyst component B. Herein the invention, the weight ratio of the outer catalyst component to the inner catalyst component is preferably in the range of 1-3, and the outer catalyst component of the outer catalyst layer comprises preferably 50 to 90% by weight of the catalyst component A and 10 to 50% by weight of the catalyst component C. The inner catalyst component of the inner catalytic layer is the catalyst component B, and the catalyst component B comprises preferably 0.5-5% by weight of noble metal catalyst component and 95-99.5% by weight of carrier.

According to the invention, the two layer catalyst composed of the outer catalyst layer and the inner catalyst layer as mentioned above is used as a catalyst structure comprised of an inactive substrate and the inner catalyst layer and the outer catalyst layer layered in this order on the substrate.

A preferred second two layer catalyst of the invention comprises:

an outer catalyst layer comprising a catalyst component A and a catalyst component C, as an outer catalyst component, wherein the catalyst component A comprises (A) (a) ceria or
   (b) praseodymium oxide or
   (c) an oxide and/or a composite oxide of at least two elements selected from the group consisting of cerium, zirconium, praseodymium, neodymium, terbium, samarium, gadolinium and lanthanum; and the catalyst component C comprises
(C) (f) a solid acid, and
   (g) a solid acid supporting an oxide of at least one element selected from the group consisting of vanadium, tungsten, molybdenum, copper, iron, cobalt, nickel and manganese; and an inner catalyst layer comprising a catalyst component A and a catalyst component C, as an inner catalyst component, wherein the catalyst component A comprises (A) (a) ceria or
   (b) praseodymium oxide or
   (c) an oxide and/or a composite oxide of at least two elements selected from the group consisting of cerium, zirconium, praseodymium, neodymium, terbium, samarium, gadolinium and lanthanum; and the catalyst component B comprises
(B) (d) a noble metal catalyst component selected from the group consisting of platinum, rhodium, palladium and oxides thereof and
   (e) a carrier.

In the second two layer catalyst of the invention, the outer catalyst component of the outer catalyst layer comprises the catalyst component A and the catalyst component C, and the inner catalyst component of the inner catalyst layer comprises the catalyst component A and the catalyst component B. The second two layer catalyst is different from the first two layer catalyst in that the inner catalyst component of the inner catalyst layer comprises the catalyst component B as well as the catalyst component A.

Also in the second two layer catalyst of the invention, the weight ratio of the outer catalyst component to the inner catalyst component is preferably in the range of 1-3, and the outer catalyst component of the outer catalyst layer comprises preferably 50 to 90% by weight of the catalyst component A and 10 to 50% by weight of the catalyst component C. In turn, the inner catalyst component of the inner catalytic layer comprises preferably 30 to 90% by weight of the catalyst component A and 0.5-5% by weight of noble metal catalyst component and 5-69.5% by weight of carrier.

Like the first two layer catalyst, the second two layer catalyst composed of the outer catalyst layer and the inner catalyst layer is used as a catalyst structure comprising an inactive substrate and the inner catalyst layer and the outer catalyst layer layered in this order on the substrate.

According to the invention, in either the first or the second two layer catalyst, the outer catalyst layer comprises at least 75% by weight, preferably at least 90% by weight of the outer catalyst component comprised of the catalyst component C and the catalyst component A. When the proportion of the outer catalyst component is less than 75% by weight based on the outer catalyst layer, the resulting outer catalyst layer is insufficient in NOx adsorption effect and selectivity in reduction of NO with ammonia under the lean conditions, and in addition, it has reduced SOx durability.

Further according to the invention, in either the first or the second two layer catalyst, the inner catalyst layer comprises at least 50% by weight, preferably at least 75% by weight of the inner catalyst component comprising (the catalyst component A) and the catalyst component B. When the proportion of the inner catalyst component is less than 50% by weight based on the inner catalyst layer, both the oxidation ability of NO under the lean conditions and the generation efficiency of ammonia under the rich conditions fall.

In the second two layer catalyst of the invention, the first catalyst component A of the inner catalytic layer comprises an oxygen storing material which functions as a NOx adsorbent. The oxygen storing material or the catalyst component A occupies a proportion of 30-90% by weight in terms of metallic oxides in the inner catalyst component. The second catalyst component B comprises a noble metal catalyst component and a carrier, and the noble metal catalyst component is preferably supported on the carrier and the catalyst component A. However, both the noble metal catalyst component and the catalyst component A may be supported on the carrier.

In the invention, as the carrier in the catalyst component B, any conventional carrier such as alumina, silica, silica-alumina, zeolite or titania may be used. The carrier is used in an amount preferably of 5-69.5% by weight based on the inner catalyst component.

In the inner catalyst layer of the second two layer catalyst of the invention, the noble metal catalyst component in the second catalyst component B is contained in the range of 0.5-5% by weight in terms of metals based on the inner catalyst components. Even if the proportion of the noble metal catalyst component is more than 5% by weight based on the inner catalyst component, no improvement in the generation efficiency of ammonia under the rich conditions is obtained, and in some cases, conversely, oxidation of ammonia adsorbed on the solid acid under the lean conditions is promoted to lower the selectivity of selective reduction of NOx with ammonia under the lean conditions. On the other hand, when the proportion of the noble metal catalyst component is less than 0.5% by weight based on the inner catalyst components, the generation efficiency of ammonia with a reducing agent falls.

In supporting the noble metal catalyst component on the carrier and the oxygen storing material, since the dispersibility thereof can be raised when the carrier used has ion exchanging ability, it is preferred that the noble metal catalyst component is supported on the carrier by ion exchanging. However, in this case also, when the ions are supported on the carrier at a proportion more than one percent, the element is in many cases supported as a mixture of ions and oxides because of limited ion exchange ability of the carrier.

The inner catalyst component in the second two layer catalyst of the invention is obtained as powder comprised of the carrier or the oxygen storing material supporting the noble metal catalyst component thereon preferably by a method as follows. First, the noble metal catalyst component is supported on the carrier such as alumina or the oxygen storing material by a method such as an impregnation or an ion exchange method, and then the resulting product is calcined at a temperature of 500-900° C. in an oxidative or a reductive atmosphere. Of course, if necessary, the inner catalyst component in the second two layer catalyst of the invention may be obtained as powder by preparing a carrier such as alumina on which the noble metal catalyst component is supported as mentioned above and an oxygen storing material separately and then mixing these together.

According to the invention, it is preferred that the catalyst component A in the single layer catalyst and the first two layer catalyst is such that it supports at least one noble metal catalyst component selected from the group consisting of platinum, rhodium, palladium and oxides thereof. It is also preferred that at least one of the catalyst component A in the outer catalyst component and the catalyst component A in the inner catalyst component in the second two layer catalyst is such that it supports at least one noble metal catalyst component selected from the group consisting of platinum, rhodium, palladium and oxides thereof.

When the catalyst component A supports at least one noble metal catalyst component thereon selected from the group consisting of platinum, rhodium, palladium and oxide thereof in this way, the adsorption of NOx to the catalyst component A or the oxygen storing material is promoted in wide temperature range, and as a result, NOx purification rate is improved over wide temperature range. In addition, the heat resistance of the catalyst is also improved because thermal degradation of the catalyst component A due to NOx adsorption is suppressed.

The catalyst component A in the catalyst of the invention mainly serves to adsorb NOx contained in exhaust gases under the lean conditions. The catalyst component A has both NO adsorption sites and $NO_2$ adsorption sites. In general, NO adsorption sites are more in number, although the numbers of the sites depend on the kind of the oxides used. The catalyst component B containing the noble metal catalyst component not only serves to reduce NOx adsorbed on the catalyst component A with high efficiency in this way under the rich excursion, but also oxidize NO thereby to raise the NOx adsorption rate under the lean conditions. Among the various noble metal catalyst components, platinum is most preferred from the standpoint of ammonia generation efficiency and NO oxidation ability. However, when a catalyst is to have good performance at low temperature, rhodium or palladium that are superior in ammonia generation efficiency at low temperature is preferred. A combination of platinum and at least one of rhodium and palladium is also preferred.

According to the invention, it is preferred that the catalyst is a two layer catalyst that has an outer catalyst layer and an inner catalyst layer, as described hereinbefore. In the case of two layer catalyst (either the first or the second two layer catalyst), $SO_2$ contained in exhaust gases is adsorbed mainly as $SO_2$ on the catalyst component A of the outer catalyst layer before it is oxidized with a noble metal catalyst component in the inner catalyst layer, and thus $SO_2$ is readily desorbed into the gas phase under the rich conditions. As a result, the catalyst of the invention has an advantage that the activity thereof is not deteriorated even in the presence of SOx. On the other hand, under a short period of the rich conditions, NOx is reduced promptly to ammonia, but not to nitrogen, with aid of high reducing ability of the noble metal catalyst component in the inner catalytic layer. The thus generated ammonia by the reduction of NOx in this way almost completely caught by the solid acid catalyst component C (supporting a metallic oxide thereon) of the outer catalyst layer without being desorbed into the gas phase.

Furthermore, the ammonia thus caught by the catalyst component C is used for selective reduction of NO with ammonia in the presence of oxygen in the following lean excursion. That is to say, the ammonia thus caught by the catalyst component C is used effectively in selective reduction of NOx with ammonia on the catalyst component C without being reoxidized with the noble metal catalyst component in the inner catalytic layer under the following lean excursion. Consequently, the catalyst of the invention has high NOx purification rate under the lean/rich excursions.

The inner catalyst layer of the second two layer catalyst of the invention has not only the catalytic component A but also the catalyst component B. Accordingly, $SO_2$ contained in exhaust gases is adsorbed mainly as $SO_2$ on the catalyst component A of the outer catalyst layer before it is oxidized with the noble metal catalyst component in the inner catalyst layer, and thus $SO_2$ is readily desorbed into the gas phase under the rich conditions. As a result, the catalyst of the invention has an advantage that the activity is not deteriorated even in the presence of SOx. In addition, the adsorption rate of $NO_2$ generated by oxidation of NO on the noble metal catalyst component in the inner catalyst layer is improved so that higher NOx purification rate can be obtained over the lean/rich excursions.

When the catalyst of the invention has an outer and an inner catalyst layer, the thickness of the outer catalyst layer has a great influence on the NOx reduction activity of the catalyst in the rich/lean excursions and the resistance to SOx of the catalyst. The optimum thickness of the outer catalyst layer depends on the reaction conditions such as temperature, oxygen concentration or space velocity (SV) under which the reaction is carried out, however, the thickness of the outer catalyst layer is in the range of 20 μm to 80 μm so that the catalyst is highly active in the catalytic reduction of NOx in the rich/lean excursions, and preferably it is about 40 μm. If the outer catalyst layer is more than 80 μm in thickness, the catalyst is not improved in the activity accordingly, and on the contrary, the performance falls because the diffusion of NOx and a reducing agent used into the inner catalyst layer is hindered. On the other hand, if the outer catalyst layer is less than 20 μm in thickness, the adsorption amount of NOx and SOx falls and the capturing amount of ammonia generated in the inner catalyst layer under the rich conditions falls while NOx is insufficiently oxidized with ammonia under the lean condition. As a result, the purification ability of the catalyst falls. Herein the invention, the thickness of catalyst layer can be calculated from the amount of the catalyst containing slurry coated on a substrate assuming that for purpose of convenience the catalyst layer has an apparent density of 1.0 $g/cm^3$.

The inner catalyst layer contains the inner layer catalyst component that has high ability for NOx oxidation with the noble metal catalyst component and high ability for ammonia generation and accordingly the influence of the thickness of the inner catalyst layer on the NOx reduction activity in the rich/lean excursions is not so significant as that of the outer catalyst layer. However, it is preferred that the inner catalyst layer has a thickness usually in the range from 10 μm to 50 μm. If the inner catalyst layer is more than 50 μm in thickness, the catalyst is not improved in the activity accordingly. On the other hand, when the inner catalyst layer is less than 10 μm in thickness, the total NOx reduction activity of the catalyst falls over the whole rich/lean excursions.

The catalyst components used in the catalyst of the invention is obtained in various shapes such as powder or particles. Accordingly, the catalyst component can be molded to any shape such as honeycomb, annular or spherical shapes by any of hitherto well known methods. If desired, any additives, such as molding additives, reinforcements, inorganic fibers or organic binders may be used when the catalyst structure is prepared.

The catalyst of the invention may advantageously be used as a catalyst structure that is composed of an inactive substrate of any desired shape having a catalyst layer thereon prepared by a wash-coating method, for example, by coating the catalyst component on the surface of the substrate. The inactive substrate may be composed of, for example, a clay mineral such as cordierite or a metal such as stainless steel, preferably of heat-resistant, such as a Fe—Cr—Al steel, and may be in the form of honeycomb, annular or spherical structures.

In the case of two layer catalyst which is a preferred embodiment of the catalyst of the invention, the catalyst components for the outer and inner catalyst layer is obtained in various shapes such as powder or particles, as mentioned above. Thus, an inner catalyst layer is first formed by molding the inner catalyst component to any desired shape such as honeycomb, annular or spherical structures, and then forming an outer catalyst layer on the inner catalyst layer, thereby obtaining catalyst structures in various shapes. If desired, any additives, such as molding additives, reinforcements, inorganic fibers or organic binders may be used when the catalyst structure is prepared.

The catalyst of the invention is excellent in resistance to sulfur oxides as well as resistance to heat. Therefore, it is suitable for use as, for example, a catalyst for the reduction of nitrogen oxides or for the denitrization of exhaust gases from diesel engines or exhaust gases from lean gasoline automobile engines.

The catalyst of the invention is used preferably in a catalytic reaction in which the combustion atmosphere of fuel is oscillated between the rich conditions and the lean conditions mentioned hereinbefore. The period of the catalytic reaction (i.e., the interval between the rich atmosphere (or the lean atmosphere) and the subsequent rich atmosphere (or the lean atmosphere) is preferably 5-150 seconds and more preferably 30-90 seconds. The rich/lean span, that is, the time under the rich conditions (seconds)/the time under the lean conditions (seconds) is usually between 0.5/5 and 10/150, more preferably between 2/30 and 5/90.

The rich conditions are normally prepared by periodically injecting fuel into a combustion chamber of an engine at an air/fuel weight ratio of 10-14 in the case of using gasoline as fuel. The typical exhaust gases under the rich conditions contain several hundred volume ppm of NOx, 5-6% by volume of water, 2-3% by volume of CO, 2-3% by volume of hydrogen, several thousands volume ppm of hydrocarbons and 0-0.5% by volume of oxygen.

In turn, the lean conditions are normally prepared by periodically injecting fuel into a combustion chamber of an engine at an air/fuel weight ratio of 20-40 in case of using gasoline as fuel. The typical exhaust gases under the lean conditions contain several hundred volume ppm of NOx, 5-6% by volume of water, several thousands volume ppm of CO, several thousands volume ppm of hydrogen, several thousand volume ppm of hydrocarbons and 5-10% by volume of oxygen.

The temperature at which the catalytic reduction of NOx is carried out using the catalyst of the invention is usually in the range of 150-550° C., preferably in the range of 200-500° C., so that the catalyst has an effective catalyst activity for the reduction of NOx over a long period of time in the rich excursion, although it depends on the exhaust gases to be reacted. Within the above recited temperature range of the reaction, the exhaust gases are treated preferably at a space velocity of 5,000-150,000 $h^{-1}$.

According to the method of the invention, NOx containing exhaust gases are brought into contact with the catalyst described above in the periodic rich/lean excursions so that the NOx is catalytically reduced in a stable and efficient manner even in the presence of oxygen, sulfur oxides or moisture.

The catalyst of the invention may be used, if necessary, in combination with the known NOx storage-reducing catalyst used in the NOx storage-reducing system which NOx stores under the lean conditions and reduces it under the rich conditions. That is, the NOx storage-reducing catalyst is used as the first or upstream catalyst to treat exhaust gases from engines and then the exhaust gases are treated by using the catalyst of the invention as the second or a downstream catalyst.

The NOx storage-reducing catalyst stores NOx contained in exhaust gases under the lean conditions and reduces the NOx to nitrogen with such a reducing agent as hydrocarbon or carbon monoxide contained in a large amount in the exhaust gases under the rich conditions, under which conditions ammonia is generated in an amount more or less as a byproduct. In such a case, it is possible that the ammonia thus generated is released behind the catalyst without being adsorbed on the catalyst to bring about an environmental problem since the NOx storage-reducing catalyst is highly alkaline.

On the other hand, the catalyst of the invention adsorbs NOx under the lean conditions, and converts the thus adsorbed NOx to ammonia and adsorbs the ammonia thereon, and then causes the reaction of ammonia with gaseous NOx under the lean conditions, thereby purifying NOx in a high efficiency by the selective reduction of NOx with ammonia in this way. The catalyst of the invention contains essentially a component to adsorb ammonia thereon, that is, a solid acid. Accordingly, the catalyst of the invention cannot use strongly alkaline components such as alkaline earth or alkali metal. Consequently, when exhaust gases treating are treated using the catalyst of the invention, there is the possibility that NOx adsorption amount falls at high temperature and NOx purification is not carried out effectively at high temperature. Thus, in some cases, it may be desired that the catalyst of the invention is used in combination with the known NOx storage-reducing catalyst when NOx purification is carried out at high temperature.

Under these circumstances, when the NOx storage-reducing catalyst is used as the upstream catalyst and the catalyst of the invention is used as the downstream catalyst, the ammonia generated by treatment of exhaust gases with the upstream catalyst is caused to be adsorbed on the downstream catalyst, thereby the ammonia can be made good use of for reduction of NOx. Furthermore, in the case exhaust gases are treated with the upstream catalyst, the use of such a catalyst that has higher NOx purification ability at higher temperature than the downstream catalyst makes it possible to achieve higher NOx purification efficiency at a wider temperature range.

As the upstream catalyst or the NOx storage-reducing catalyst, there may be used a so-called NOx storage-reduction catalyst comprised of a carrier such as alumina and a noble metal catalyst component supported thereon together with at least one selected from the group consisting of an alkali metal such as potassium, sodium, lithium and cesium and alkaline earth metal such as barium or calcium and a rare earth element such as lanthanum, cerium and yttrium. Alternatively, there may be used a so-called NOx adsorption catalyst comprised of a carrier such as alumina and a least one selected from the group consisting of alkali metals and alkaline earth metals, at least one selected from rare earth elements and at least one noble metal catalyst such as platinum, and if necessary, additionally titanium.

INDUSTRIAL AVAILABILITY OF THE INVENTION

The use of the catalyst of the invention makes it possible to catalytically reduce NOx contained in exhaust gases with high durability at wide temperature range with no deterioration even in the presence of oxygen, sulfur oxides or water. In particular, the use of the catalyst of the invention makes it possible to catalytically reduce NOx contained in exhaust gases with high durability at wide temperature range even in the presence of oxygen, sulfur oxides or water with neither deterioration nor generation of harmful ammonia under the rich conditions which have been serious problems involved in the known NOx storage-reduction system.

EXAMPLES

The invention is now illustrated in greater detail with reference to examples of preparation of powder catalysts for use as the catalyst components and examples of preparation of honeycomb catalyst structures using the above-mentioned powder catalyst, as well as examples of catalytic activity of the thus prepared catalyst structures; however, it should be understood that the invention is not limited thereto. All the parts and percentages are hereinafter on the basis of weight unless otherwise specified.

(1) Preparation of Catalyst Component A

Preparation Example 1

151.37 g of cerium nitrate ($Ce(NO_3)_3.6H_2O$) was dissolved in 1000 ml of ion-exchanged water to prepare an aqueous solution. 0.1-N ammonia water was added to the aqueous solution to neutralize and hydrolyze the cerium ions, and the resulting mixture was aged for one hour. The product was separated from the resulting slurry by filtering, dried at a temperature of 120° C. for 24 hours, and then calcined in the air at a temperature of 500° C. for three hours to obtain ceria powder (having a specific surface area of 138 $m^2/g$).

Preparation Example 2

103.77 g of cerium nitrate ($Ce(NO_3)_3.6H_2O$) and 35.77 g of praseodymium oxide ($Pr(NO_3)_3.6H_2O$) were dissolved in 1000 ml of ion-exchanged water to prepare an aqueous solution. 0.1-N ammonia water was added to the aqueous solution to neutralize and hydrolyze the cerium salt and praseodymium salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/praseodymium oxide composite oxide powder (having an oxide weight ratio of 60/40 and a specific surface area of 112 $m^2/g$).

Preparation Example 3

34.59 g of cerium nitrate ($Ce(NO_3)_3.6H_2O$), 84.45 g of zirconium oxynitrate ($ZrO(NO_3)_2$) and 7.97 g of lanthanum nitrate ($La(NO_3)_3.6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and lanthanum salt, and the resulting mixture was aged at a temperature of 80° C. for one hour. The resulting product was separated from the obtained slurry by filtering, dried at a temperature of 120° C. for 24 hours, and then calcined in the air at a temperature of 500° C. for three hours to obtain ceria/zirconia/lanthanum oxide composite oxide powder (having an oxide weight ratio of 22/73/5 and a specific surface area of 80 $m^2/g$).

Preparation Example 4

121.06 g of cerium nitrate ($Ce(NO_3)_3.6H_2O$), 28.12 g of zirconium oxynitrate ($ZrO(NO_3)_2$) and 7.48 g of gadolinium nitrate ($Gd(NO_3)_3.6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and gadolinium salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/zirconia/gadolinium oxide composite oxide powder (having an oxide weight ratio of 72/24/4 and a specific surface area of 198 $m^2/g$).

Preparation Example 5

109.43 g of cerium nitrate ($Ce(NO_3)_3.6H_2O$), 31.27 g of zirconium oxynitrate ($ZrO(NO_3)_2$) and 15.63 g of neodymium nitrate ($Nd(NO_3)_3.6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and neodymium salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/zirconia/neodymium oxide composite oxide powder (having an oxide weight ratio of 70/20/10 and a specific surface area of 171 $m^2/g$).

Preparation Example 6

103.77 g of cerium nitrate ($Ce(NO_3)_3.6H_2O$) and 40.96 g of terbium nitrate ($Tb(NO_3)_3.6H_2O$) were dissolved in 1000 ml of ion-exchanged water to prepare an aqueous solution. 0.1-N ammonia water was added to the aqueous solution to neutralize and hydrolyze the cerium salt and terbium salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/terbium oxide composite oxide powder (having an oxide weight ratio of 70/30 and a specific surface area of 139 $m^2/g$).

Preparation Example 7

121.06 g of cerium nitrate ($Ce(NO_3)_3.6H_2O$), 28.12 g of zirconium oxynitrate ($ZrO(NO_3)_2$) and 3.40 g of samarium nitrate ($Sm(NO_3)_3.6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and samarium salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/zirconia/samarium oxide composite oxide powder (having an oxide weight ratio of 72/24/4 and a specific surface area of 187 $m^2/g$).

(2) Preparation of Catalyst Component B

Preparation Example 8

8.40 g of $Pt(NH_3)_4(NO_3)_2$ aqueous solution (9.0% as platinum) was added to 100 ml of ion-exchanged water to prepare an aqueous solution. 60 g of γ-alumina (KC-501 available from Sumitomo Kagaku Kogyo K. K., the same hereunder) was added to the solution, followed by drying at 100□ with agitation and calcining at 500□ for three hours in the air to provide a powder catalyst composed of γ-alumina supporting 1% of platinum thereon.

Preparation Example 9

4.20 g of rhodium nitrate aqueous solution (9.0% as rhodium) and 8.40 g of $(Pt(NH_3)_4(NO_3)_2$ aqueous solution (9.0% as platinum) were used in place of 8.40 g of $(Pt(NH_3)_4(NO_3)_2$ aqueous solution (9.0% as platinum), and otherwise in the same manner as Preparation Example 8, a powder catalyst composed of γ-alumina supporting 1% of platinum and 0.5% of rhodium thereon was obtained.

Preparation Example 10

4.20 g of palladium nitrate solution (9.0% as palladium) and 8.40 g of $(Pt(NH_3)_4(NO_3)_2$ solution (9.0% as platinum) were used in place of 8.40 g of $(Pt(NH_3)_4(NO_3)_2$ solution (9.0% as platinum), and otherwise in the same manner as Preparation Example 8, a powder catalyst composed of γ-alumina supporting 1% of platinum and 0.5% of palladium thereon was obtained.

(3) Preparation of Catalyst Component C

Preparation Example 11

Ammonia mordenite-10 (available from Zoude Chemical Inc., $SiO_2/Al_2O_3$ molar ratio=10) was calcined at a temperature of 500° C. for three hours in the air to obtain H-mordenite.

Preparation Example 12

Ammonia β-zeolite-25 (available from Zoude Chemical Inc., $SiO_2/Al_2O_3$ molar ratio=25) was calcined at a temperature of 500° C. for three hours in the air to obtain H-β-zeolite.

Preparation Example 13

An appropriate amount of water was added to 60 g of metatitanic acid $(TiO(OH)_2)$ obtained from a sulfuric acid process to prepare a slurry. 6.7 g in terms of $WO_3$ of an aqueous solution of ammonium metatungstate (5.0% as $WO_3$) was added to the slurry and then the resulting mixture was evaporated to dryness with agitation. The resulting solid was calcined at a temperature of 500° C. for three hours in the air to obtain titanium oxide powder supporting 10% of $WO_3$ thereon.

Preparation Example 14

An appropriate amount of water was added to 60 g of zirconium oxide to prepare a slurry. 6.7 g in terms of $WO_3$ of an aqueous solution of ammonium metatungstate (5.0% as $WO_3$) and 0.67 g in terms of $V_2O_5$ of an aqueous solution of vanadium oxalate (10% as $V_2O_5$) were added to the slurry and then the resulting mixture was evaporated to dryness with agitation. The resulting solid was calcined at a temperature of 500° C. for three hours in the air to obtain zirconium oxide powder supporting 1% of $V_2O_5$ and 10% of $WO_3$ thereon.

Preparation Example 15

An appropriate amount of water was added to 60 g of ammonium β-zeolite-25 (available from Zoude Chemical Inc., $SiO_2/Al_2O_3$ molar ratio=25) to prepare a slurry. 1.54 g in terms of CuO of cupric nitrate was added to the slurry and then the resulting mixture was evaporated to dryness with agitation. The resulting solid was calcined at a temperature of 500° C. for three hours in the air to obtain β-zeolite supporting 2.5% of CuO thereon.

Preparation Example 16

An appropriate amount of water was added to 60 g of ammonium β-zeolite-25 (available from Zoude Chemical Inc., $SiO_2/Al_2O_3$ molar ratio=25) to prepare a slurry. 1.54 g in terms of $Fe_2O_3$ of ferric nitrate was added to the slurry and then the resulting mixture was evaporated to dryness with agitation. The resulting solid was calcined at a temperature of 500° C. for three hours in the air to obtain β-zeolite supporting 2.5% of $Fe_2O_3$ thereon.

(4) Preparation of Catalyst Component A and B

Preparation Example 17

151.37 g of cerium nitrate $(Ce(NO_3)_3 \cdot 6H_2O)$ was dissolved in 1000 ml of ion-exchanged water to prepare an aqueous solution. 0.1-N ammonia water was added to the aqueous solution to neutralize and hydrolyze the cerium ions, and the resulting mixture was aged for one hour. The product was separated from the resulting slurry by filtering, dried at a temperature of 120° C. for 24 hours, and then calcined in the air at a temperature of 500° C. for three hours to obtain ceria powder (having a specific surface area of 138 $m^2/g$).

8.40 g of $Pt(NH_3)_4(NO_3)_2$ solution (9.0% as platinum) was added to 100 ml of ion-exchanged water to prepare a solution. 30 g of γ-alumina and 30 g of the ceria powder were added to the solution, followed by drying at 100□ with agitation and calcining at 500□ for three hours in the air to obtain a powder catalyst composed of γ-alumina/ceria (having a weight ratio of 1/1) supporting 1% of platinum thereon.

10 g of γ-alumina and 50 g of the ceria powder were used in the above-mentioned preparation of powder catalyst composed of γ-alumina/ceria (having a weight ratio of 1/1) supporting 1% of platinum thereon, and otherwise in the same manner as mentioned above, a powder catalyst composed of γ-alumina/ceria (having a weight ratio of 1/5) supporting 1% of platinum thereon was obtained Preparation Example 18

4.20 g of aqueous solution of rhodium nitrate (9.0% as rhodium) and 8.40 g of $Pt(NH_3)_4(NO_3)_2$ aqueous solution (9.0% as platinum) were used in place of 8.40 g of $Pt(NH_3)_4(NO_3)_2$ aqueous solution (9.0% as platinum) and 10 g of γ-alumina and 50 g of the ceria powder were used, and otherwise in the same manner as Preparation Example 17, a powder catalyst composed of γ-alumina/ceria (having a weight ratio of 1/5) supporting 1% of platinum and 0.5% of rhodium thereon was obtained.

Preparation Example 19

4.20 g of aqueous solution of palladium nitrate (9.0% as palladium) and 8.40 g of $Pt(NH_3)_4(NO_3)_2$ aqueous solution (9.0% as platinum) were used in place of 8.40 g of $Pt(NH_3)_4$ $(NO_3)_2$ aqueous solution (9.0% as platinum) were used, and otherwise in the same manner as Preparation Example 17, a powder catalyst composed of γ-alumina/ceria (having a weight ratio of 1/1) supporting 1% of platinum and 0.5% of palladium thereon was obtained.

Preparation Example 20

34.59 g of cerium nitrate ($Ce(NO_3)_3 \cdot 6H_2O$), 84.45 g of zirconium oxynitrate ($ZrO(NO_3)_2$) and 7.97 g of lanthanum nitrate ($La(NO_3)_3 \cdot 6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and lanthanum salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/zirconia/lanthanum oxide composite oxide powder (having an oxide weight ratio of 22/73/5 and a specific surface area of 80 $m^2/g$).

Thereafter, a powder catalyst composed of a mixture of γ-alumina and ceria/zirconia/lanthanum oxide composite oxide (having a weight ratio of 1/2) supporting 2% of platinum thereon was obtained in the same manner as Preparation Example 17.

Preparation Example 21

77.83 g of cerium nitrate ($Ce(NO_3)_3 \cdot 6H_2O$), 36.03 g of zirconium oxynitrate ($ZrO(NO_3)_2$) and 35.26 g of praseodymium nitrate ($Pr(NO_3)_3 \cdot 6H_2O$) were dissolved in 1000 ml of ion-exchanged water to prepare an aqueous solution. 0.1-N ammonia water was added to the aqueous solution to neutralize and hydrolyze the cerium salt, oxyzirconium salt and praseodymium salt, and the resulting mixture was aged for one hour. The resulting product was separated from the obtained slurry by filtering, dried at a temperature of 120° C. for 24 hours, and then calcined in the air at a temperature of 500° C. for three hours to obtain ceria/zirconia/praseodymium oxide composite oxide powder (having an oxide weight ratio of 47/33/22 and a specific surface area of 205 $m^2/g$).

Thereafter, a powder catalyst composed of a mixture of γ-alumina and ceria/zirconia/praseodymium oxide composite oxide (having a weight ratio of 1/2) supporting 2% of platinum thereon was obtained in the same manner as Preparation Example 8.

(5) Preparation of Catalyst Component A Supporting Noble Metal Catalyst Component Preparation Example 22

8.40 g of $(Pt(NH3)_4(NO_3)_2$ aqueous solution (9.0% as platinum) was added to 100 ml of ion-exchanged water to prepare an aqueous solution. 60 g of ceria powder prepared in Preparation Example 1 was added to the aqueous solution, followed by drying at 100° with agitation and calcining at 500□ for three hours in the air to provide a powder catalyst composed of ceria supporting 1% of platinum thereon.

Preparation Example 23

8.40 g of $Pt(NH_3)_4(NO_3)_2$ aqueous solution (9.0% as platinum) and 4.20 g of palladium nitrate aqueous solution (9.0% as palladium) were added to 100 ml of ion-exchanged water to prepare an aqueous solution. 60 g of ceria powder prepared in Preparation Example 1 was added to the aqueous solution, followed by drying at 100□ with agitation and calcining at 500□ for three hours in the air to provide a powder catalyst composed of ceria supporting 1% of platinum and 0.5% of palladium thereon.

Preparation Example 24

8.40 g of $Pt(NH_3)_4(NO_3)_2$ aqueous solution (9.0% as platinum) and 4.20 g of rhodium nitrate aqueous solution (9.0% as palladium) were added to 100 ml of ion-exchanged water to prepare an aqueous solution. 60 g of ceria powder prepared in Preparation Example 1 was added to the aqueous solution, followed by drying at 100□ with agitation and calcining at 500□ for three hours in the air to provide a powder catalyst composed of ceria supporting 1% of platinum 0.5% of rhodium thereon.

(6) Preparation of Honeycomb Catalyst Structure

The thickness of catalyst layer was calculated provided that the apparent density of the layer is 1.0 $g/cm^3$ and the geometric specific surface area of the honeycomb is 2500 $m^2/g$.

Example 1

30 g of the ceria powder catalyst prepared in Preparation Example 1, 15 g of powder catalyst prepared in Preparation Example 8 and composed of γ-alumina supporting 1% of platinum thereon, 15 g of H-mordenite prepared in Preparation Example 11, 6 g of silica sol (SNOWTEX-N, available from Nissan Chemical Industries, Ltd. (20% by weight as silica, the same hereunder) and an appropriate amount of water were mixed together. The resulting mixture was ground with a planetary mill for five minutes by using 50 g of zirconia balls as grinding media to obtain a wash coating slurry. A honeycomb substrate made of cordierite having a cell number of 400 per square inch was coated with the wash coating slurry to obtain a honeycomb catalyst structure having a catalyst layer with a thickness of 60 μm and having the above-mentioned catalyst on the substrate.

Example 2

A honeycomb catalyst structure having a catalyst layer with a thickness of 60 μm was obtained in the same manner as Example 1 by using the ceria/praseodymium oxide composite oxide powder prepared in Preparation Example 2, the powder catalyst composed of γ-alumina supporting 1% of platinum and 0.5% of rhodium thereon prepared in Preparation Example 9 and the H-β-zeolite powder prepared in Preparation Example 12.

Example 3

A honeycomb catalyst structure having a catalyst layer with a thickness of 60 μm was obtained in the same manner as Example 1 by using the ceria/zirconia/lanthanum oxide composite oxide powder prepared in Preparation Example 3, the powder catalyst prepared in Preparation Example 9 and composed of γ-alumina supporting 1% of platinum and 0.5% of palladium thereon and the zirconium oxide powder prepared in Preparation Example 14 and supporting 1% of $V_2O_5$ and 10% of $WO_3$ thereon.

Example 4

30 g of the powder catalyst prepared in Preparation Example 8 and composed of γ-alumina supporting 1% of platinum thereon was mixed with 3 g of silica sol and an appropriate amount of water. The resulting mixture was ground with a planetary mill for five minutes by using 50 g of zirconia balls as grinding media to obtain a wash coating slurry. A honeycomb substrate made of cordierite having a cell number of 400 per square inch was coated with the wash coating slurry to obtain a honeycomb structure having an inner catalyst layer with a thickness of 30 µm having the above-mentioned catalyst on the substrate.

Then, 25 g of the ceria/zirconia/gadolinium oxide composite oxide powder prepared in Preparation Example 4 and 5 g of titanium oxide powder supporting 10% of $WO_3$ thereon were mixed with 3 g of silica sol and an appropriate amount of water. The resulting mixture was ground with a planetary mill for five minutes by using 50 g of zirconia balls as grinding media to obtain a wash coating slurry. The slurry was coated on the inner catalyst layer to obtain a honeycomb catalyst structure having an outer catalyst layer with a thickness of 60 µm having the above-mentioned catalyst on the inner catalyst layer.

Example 5

An inner catalyst layer having the catalyst prepared in Preparation Example 8 and composed of γ-alumina supporting 1% of platinum thereon and a thickness of 30 µm was formed in the same manner as Example 4. Then, a honeycomb catalyst structure having an outer catalyst layer with a thickness of 60 µm was obtained by using 25 g of the ceria/zirconia/neodymium oxide composite oxide powder prepared in Preparation Example 5 and 5 g of the β-zeolite prepared in Preparation Example 15 and supporting 2.5% of CuO thereon.

Example 6

An inner catalyst layer having the catalyst prepared in Preparation Example 8 and composed of γ-alumina supporting 1% of platinum thereon and a thickness of 30 µm was formed in the same manner as Example 5. Then, a honeycomb catalyst structure having an outer catalyst layer with a thickness of 60 µm was obtained by using 25 g of the ceria/terbium oxide composite oxide powder prepared in Preparation Example 6 and 5 g of the H-mordenite powder prepared in Preparation Example 11.

Example 7

An inner catalyst layer having the catalyst prepared in Preparation Example 8 and composed of γ-alumina supporting 1% of platinum thereon and a thickness of 30 µm was formed in the same manner as Example 5. Then, a honeycomb catalyst structure having an outer catalyst layer with a thickness of 60 µm was obtained by using 25 g of the ceria/zirconia/samarium oxide composite oxide powder prepared in Preparation Example 8 and 5 g of the H-mordenite powder prepared in Preparation Example 11.

Example 8

An inner catalyst layer having the catalyst prepared in Preparation Example 8 and composed of γ-alumina supporting 1% of platinum thereon and a thickness of 30 µm was formed in the same manner as Example 5. Then, a honeycomb catalyst structure having an outer catalyst layer with a thickness of 60 µm was obtained by using 25 g of the ceria powder prepared in Preparation Example 1 and 5 g of the H-mordenite powder prepared in Preparation Example 11.

Example 9

An inner catalyst layer having the catalyst prepared in Preparation Example 8 and composed of γ-alumina supporting 1% of platinum thereon and a thickness of 30 µm was formed in the same manner as Example 5. Then, a honeycomb catalyst structure having an outer catalyst layer with a thickness of 60 µm was obtained by using 20 g of the ceria powder prepared in Preparation Example 1 and 10 g of the H-mordenite powder prepared in Preparation Example 11.

Example 10

An inner catalyst layer having the catalyst prepared in Preparation Example 8 and composed of γ-alumina supporting 1% of platinum thereon and a thickness of 30 µm was formed in the same manner as Example 5. Then, a honeycomb catalyst structure having an outer catalyst layer with a thickness of 60 µm was obtained by using 25 g of the ceria powder prepared in Preparation Example 1 and 25 g of the H-mordenite powder prepared in Preparation Example 11.

Example 11

An inner catalyst layer having the catalyst prepared in Preparation Example 8 and composed of γ-alumina supporting 1% of platinum thereon and a thickness of 30 µm was formed in the same manner as Example 5. Then, a honeycomb catalyst structure having an outer catalyst layer with a thickness of 60 µm was obtained by using 25 g of the ceria powder prepared in Preparation Example 1 and 5 g of the β-zeolite powder prepared in Preparation Example 16 and supporting 2.5% of $Fe_2O_3$ thereon.

Example 12

An inner catalyst layer having the catalyst prepared in Preparation Example 17 and composed of powder catalyst composed of γ-alumina/ceria (having a weight ratio of 1/1) and supporting 1% of platinum thereon and a thickness of 30 µm was formed in the same manner as Example 4. Then, a honeycomb catalyst structure having an outer catalyst layer with a thickness of 60 µm was obtained by using 25 g of the ceria powder prepared in Preparation Example 1 and 5 g of the H-mordenite powder prepared in Preparation Example 11.

Example 13

An inner catalyst layer having the catalyst prepared in Preparation Example 18 and composed of γ-alumina/ceria (having a weight ratio of 1/5) and supporting 1% of platinum and 0.5% of rhodium thereon and a thickness of 30 µm was formed in the same manner as Example 4. Then, a honeycomb catalyst structure having an outer catalyst layer with a thickness of 60 µm was obtained by using 25 g of the ceria powder prepared in Preparation Example 1 and 5 g of the H-mordenite powder prepared in Preparation Example 11.

Example 14

An inner catalyst layer having the catalyst prepared in Preparation Example 19 and composed of γ-alumina/ceria (having a weight ratio of 1/1) and supporting 1% of platinum and 0.5% of palladium thereon and a thickness of 30 µm was formed in the same manner as Example 4. Then, a honeycomb catalyst structure having an outer catalyst layer with a thickness of 60 µm was obtained by using 25 g of the ceria powder prepared in Preparation Example 1 and 5 g of the H-mordenite powder prepared in Preparation Example 11.

Example 15

An inner catalyst layer having the catalyst prepared in Preparation Example 20 and composed of a mixture of γ-alumina and ceria/zirconia/lanthanum oxide composite oxide (having a weight ratio of 1/2) and supporting 2% of platinum thereon and a thickness of 30 μm was formed in the same manner as Example 4. Then, a honeycomb catalyst structure having an outer catalyst layer with a thickness of 60 μm was obtained by using 25 g of the ceria/zirconia/lanthanum oxide composite oxide powder prepared in Preparation Example 3 and 5 g of the H-mordenite powder prepared in Preparation Example 11.

Example 16

An inner catalyst layer having the catalyst prepared in Preparation Example 21 and composed of a mixture of γ-alumina and ceria/zirconia/praseodymium oxide composite oxide (having a weight ratio of 1/2) and supporting 2% of platinum thereon and a thickness of 30 μm was formed in the same manner as Example 4. Then, a honeycomb catalyst structure having an outer catalyst layer with a thickness of 60 μm was obtained by using 25 g of the ceria/praseodymium oxide composite oxide powder prepared in Preparation Example 2 and 5 g of the H-mordenite powder prepared in Preparation Example 11.

Example 17

An inner catalyst layer having the catalyst prepared in Preparation Example 21 and composed of a mixture of γ-alumina and ceria/zirconia/praseodymium oxide composite oxide (having a weight ratio of 1/2) and supporting 2% of platinum thereon and a thickness of 15 μm was formed in the same manner as Example 16. Then, a honeycomb catalyst structure having an outer catalyst layer with a thickness of 40 μm was obtained by using 5 g of H-mordenite powder prepared in Preparation Example 11.

Example 18

30 g of the ceria powder catalyst prepared in Preparation Example 22 and supporting 1% of platinum thereon, 15 g of powder catalyst prepared in Preparation Example 8 and composed of γ-alumina supporting 1% of platinum thereon and 15 g of H-mordenite prepared in Preparation Example 11 were mixed together with 6 g of silica sol and an appropriate amount of water. The resulting mixture was ground with a planetary mill for five minutes by using 50 g of zirconia balls as grinding media to obtain a wash coating slurry. A honeycomb substrate made of cordierite having a cell number of 400 per square inch was coated with the wash coating slurry to obtain a honeycomb catalyst structure having a catalyst layer with a thickness of 60 μm having the above-mentioned catalyst on the substrate.

Example 19

30 g of the powder catalyst prepared in Preparation Example 8 and composed of γ-alumina supporting 1% of platinum thereon was mixed with 6 g of silica sol and an appropriate amount of water. The resulting mixture was ground with a planetary mill for five minutes by using 50 g of zirconia balls as grinding media to obtain a wash coating slurry. A honeycomb substrate made of cordierite having a cell number of 400 per square inch was coated with the wash coating slurry to obtain a honeycomb structure having an inner catalyst layer with a thickness of 30 μm having the above-mentioned catalyst on the substrate.

Then, 25 g of the powder catalyst prepared in Preparation Example 23 and composed of ceria supporting 1% of platinum and 0.5% of palladium thereon and 5 g of H-mordenite prepared in Preparation Example 11 were mixed with 3 g of silica sol and an appropriate amount of water. A wash coating slurry was prepared in the same manner as above. The slurry was coated on the honeycomb structure to provide a honeycomb catalyst structure having an outer catalyst layer with a thickness of 60 μm having the above-mentioned catalyst.

Example 20

An inner catalyst layer with a thickness of 60 μm was formed using the powder catalyst prepared in Preparation Example 17 and composed of γ-alumina/ceria (having a weight ratio of 1/1) supporting 1% of platinum thereon in the same manner as Example 4. Then, a honeycomb catalyst structure having an outer catalyst layer with a thickness of 60 μm was obtained by using 25 g of the powder catalyst prepared in Preparation Example 17 and composed of ceria supporting 1% of platinum 0.5% of rhodium thereon.

Comparative Example 1

8.40 g of $(Pt(NH_3)_4(NO_3)_2$ aqueous solution (9.0% as platinum) was added to 100 ml of ion-exchanged water to prepare an aqueous solution. 60 g of γ-alumina was added to the aqueous solution, followed by drying at 100□ with agitation and calcining at 500□ for three hours in the air to provide a powder catalyst composed of γ-alumina supporting 1% of platinum thereon.

Thereafter, a honeycomb catalyst structure having an inner catalyst layer with a thickness of 30 μm composed of the same γ-alumina supporting 1% of platinum thereon as above and an outer catalyst layer with a thickness of 60 μm using the ceria/zirconia/lanthanum oxide composite oxide powder prepared in Preparation Example 3.

Comparative Example 2

8.40 g of $(Pt(NH3)_4(NO_3)_2$ aqueous solution (9.0% as platinum) was added to 100 ml of ion-exchanged water to prepare an aqueous solution. 60 g of γ-alumina was added to the aqueous solution, followed by drying at 100□ with agitation and calcining at 500□ for three hours in the air to provide a powder catalyst composed of γ-alumina supporting 1% of platinum thereon.

151.37 g of cerium nitrate $(Ce(NO_3)_3 \cdot 6H_2O)$ was dissolved in 1000 ml of ion-exchanged water to prepare an aqueous solution. 0.1-N ammonia water was added to the aqueous solution to neutralize and hydrolyze the cerium ions, and the resulting mixture was aged for one hour. The product was separated from the resulting slurry by filtering, dried at a temperature of 120° C. for 24 hours, and then calcined in the air at a temperature of 500° C. for three hours to obtain ceria powder (having a specific surface area of 138 m$^2$/g).

4.20 g of rhodium nitrate aqueous solution (9.0% as rhodium) was added to 100 ml of ion-exchanged water to prepare an aqueous solution. 30 g of the ceria powder prepared above was added to the aqueous solution, followed by drying at 100□ with agitation and calcining at 500□ for three hours in the air to provide a powder catalyst composed of ceria supporting 1% of rhodium thereon.

Thereafter, a honeycomb catalyst structure having an inner catalyst layer with a thickness of 30 μm using the γ-alumina supporting 1% of platinum thereon prepared above and an outer catalyst layer with a thickness of 60 μm using the ceria supporting 1% of rhodium thereon prepared above in the same manner as Example 1.

Comparative Example 3

Barium carbonate was prepared by using aqueous solutions of barium hydroxide and sodium carbonate. The barium carbonate ($BaCO_3$) and γ-alumina were mixed together in a weight ratio of 8 to 2, and 1% of platinum was supported on the mixture to prepare a catalyst powder.

γ-Alumina was added to an aqueous solution of potassium carbonate, and the resulting mixture was dried and calcined at 1100° C. for three hours in the air to provide $K_2O.12Al_2O_3$ (having a specific surface area of 18 $m^2/g$). Furthermore, γ-alumina was mixed with $K_2O.12Al_2O_3$ prepared above in a weight ratio of 9 to 1 to prepare a mixture of γ-alumina/$K_2O.12Al_2O_3$ and 1% of platinum was supported on the mixture thereby providing a catalyst powder.

48 g of the above-mentioned catalyst powder composed of $BaCO_3$/γ-alumina supporting 1% of platinum thereon and 12 g of the catalyst powder composed of γ-alumina/$K_2O.12Al_2O_3$ supporting 1% of platinum thereon prepared above were dry mixed, and using this mixture, a wash coating slurry was prepared in the same manner as Example 1. The slurry was then coated on the same cordierite honeycomb substrate as used in Example 1 in the same manner as Example 1 thereby providing a honeycomb catalyst structure having a layer of the catalyst on the surface 80 μm in thickness.

(7) Performance Test

A nitrogen oxide-containing gas was treated under the conditions below by using each of the catalysts prepared in Examples and Comparative Examples. The NOx conversion (removal) was measured by a chemical luminescence method.

Testing Method

The composition of the gas mixture used in the reduction experiment of NOx under the rich conditions was as follows:
NO: 100 ppm
$SO_2$: 50 ppm
$O_2$: 0.4 ppm
CO: 2%
$C_3H_6$ (propylene): 2000 ppm
$H_2$: 2%
$H_2O$: 9.0%

The gas used under the lean conditions was prepared by injecting oxygen into the gas mixture used under the rich conditions, and the composition thereof was as follows:
NO: 100 ppm
$SO_2$: 50 ppm
$O_2$: 9.0%
CO: 0.2%
$C_3H_6$ (propylene): 500 ppm
$H_2$: 0%
$H_2O$: 6.0%

The catalyst reaction was carried out with the rich/lean span in the range of 3/30 (s/s) to 12/120 (s/s) to examine the performance of each of the catalysts.

(i) Space Velocity:
100000 $h^{-1}$ (under the lean conditions)
100000 $h^{-1}$ under the rich conditions)

(ii) Reaction Temperature:
200, 250, 300, 400, 450 and 500° C.

As the results are shown in Table 1, the catalysts of the invention have high conversion rate of nitrogen oxides, whereas the catalysts of Comparative Examples have on the whole a low conversion rate of nitrogen oxides.

TABLE 1

| | Nox Conversion (%) Temperature (C.) | | | | | | |
|---|---|---|---|---|---|---|---|
| | 200 | 250 | 300 | 350 | 400 | 450 | 500 |
| Example 1 | 68.3 | 81.7 | 84.2 | 84.0 | 83.3 | 74.8 | 65.2 |
| Example 2 | 76.2 | 85.5 | 85.9 | 83.8 | 81.7 | 71.4 | 62.1 |
| Example 3 | 79.4 | 85.7 | 86.0 | 86.0 | 82.6 | 74.1 | 68.4 |
| Example 4 | 62.8 | 76.6 | 79.3 | 80.2 | 81.6 | 73.0 | 65.5 |
| Example 5 | 72.4 | 82.3 | 85.7 | 85.6 | 82.0 | 75.3 | 68.5 |
| Example 6 | 73.0 | 87.4 | 88.2 | 88.6 | 82.4 | 80.3 | 72.1 |
| Example 7 | 64.8 | 78.5 | 80.2 | 79.7 | 73.7 | 69.8 | 61.3 |
| Example 8 | 77.6 | 88.5 | 90.3 | 91.5 | 87.9 | 82.0 | 73.7 |
| Example 9 | 73.7 | 85.7 | 87.5 | 89.7 | 89.2 | 83.7 | 76.5 |
| Example 10 | 69.4 | 83.6 | 85.9 | 86.4 | 84.0 | 79.3 | 71.6 |
| Example 11 | 74.5 | 85.6 | 88.8 | 88.6 | 87.6 | 81.6 | 75.9 |
| Example 12 | 79.6 | 90.8 | 92.5 | 92.4 | 88.1 | 85.0 | 79.2 |
| Example 13 | 83.8 | 91.6 | 92.8 | 92.1 | 85.4 | 82.7 | 74.5 |
| Example 14 | 84.5 | 92.4 | 92.4 | 91.8 | 84.3 | 81.0 | 72.8 |
| Example 15 | 78.2 | 89.7 | 93.8 | 93.9 | 90.1 | 89.4 | 85.4 |
| Example 16 | 80.4 | 90.5 | 93.4 | 93.5 | 88.7 | 85.7 | 81.5 |
| Example 17 | 75.4 | 86.1 | 88.8 | 88.4 | 85.6 | 84.6 | 79.2 |
| Example 18 | 79.1 | 87.7 | 91.8 | 91.3 | 87.1 | 78.5 | 71.5 |
| Example 19 | 81.3 | 89.2 | 92.4 | 93.3 | 90.7 | 86.5 | 75.8 |
| Example 20 | 88.7 | 80.6 | 80.5 | 79.7 | 73.5 | 67.3 | 68.1 |
| Comprative 1 | 75.8 | 80.6 | 80.5 | 79.7 | 73.5 | 67.3 | 68.1 |
| Comprative 2 | 83.9 | 82.9 | 80.4 | 75.0 | 68.8 | 53.2 | 41.6 |
| Comprative 3 | 63.3 | 85.5 | 86.1 | 85.5 | 83.8 | 81.2 | 78.3 |

Furthermore, using the catalyst structures prepared in Example 15 and Comparative Examples 1 and 3, catalyst durability tests were carried out under the same gas conditions as mentioned above at a temperature of 350□ with a rich/lean span of 55/5 (s/s) over a period of 50 hours. As the results are shown in Table 2, the catalyst of the invention has much higher resistance to sulfur oxides than the known NOx storage reduction system.

TABLE 2

| | Nox Conversion (%) Running Time (h) | | | | | |
|---|---|---|---|---|---|---|
| | 0 | 10 | 20 | 30 | 40 | 50 |
| Example 15 | 93.8 | 93.2 | 93.4 | 92.8 | 92.8 | 89.9 |
| Comparative 1 | 79.9 | 79.7 | 78.5 | 77.0 | 74.0 | 70.2 |
| Comparative 3 | 85.7 | 42.8 | 31.7 | 24.3 | 23.4 | 22.9 |

(8) Test for Confirming the Generation of Nitrogen (i) Preparation of Catalyst Layer Using the Catalyst of the Invention 10 g of the powder catalyst prepared in Preparation Example 8 (catalyst component B) was mixed with 24 g of silica sol and an appropriate amount of water, and then water was evaporated from the resulting mixture to dryness. The resulting solid was then calcined at a temperature of 500° C. for one hour in the air. The resulting product was sieved so as to have a particle diameter in the range of 0.25 to 0.5 mm to prepare an inner catalyst component (catalyst component B) composed of particles having the above-mentioned particle diameter.

3 g of the powder catalyst prepared in Preparation Example 11 (catalyst component C) and 7 g of the powder catalyst prepared in Preparation Example 3 (catalyst component A) were mixed with 24 g of silica sol and an appropriate amount of water. The resulting mixture was ground with a planetary mill to prepare a slurry for use to prepare an outer catalyst component (catalyst components A and C). The slurry was sprayed on the inner catalyst component composed of the above-mentioned particles, followed by drying and calcining at a temperature of 500° C. for one hour in the air to prepare a powder catalyst composed of the inner catalyst component having the outer catalyst component on the surface of the inner catalyst component. The weight of the powder catalyst was weighed.

Then, the slurry of the outer catalyst component was further sprayed on the surface of the thus obtained powder catalyst, followed by drying and calcining repeatedly in the same manner as above until the weight ratio of the outer catalyst component to the inner catalyst component reached 4 to 1. 0.5 g of the thus obtained catalyst was placed in a reaction tube made of quartz to form a catalyst layer.

(ii) Preparation of Catalyst Layer Using the Catalyst of the Comparative Example The water was evaporated from the wash coating slurry obtained in Comparative Example 3 to dryness, followed by calcining at a temperature of 500° C. for one hour in the air. The resulting calcined product was sieved so as to have a particle diameter in the range of 0.25 to 0.5 mm to prepare a catalyst component composed of the particles having the above-mentioned particle diameter. 0.5 g of the thus obtained catalyst was placed in a reaction tube made of quartz to form a catalyst layer.

(iii) Reaction Test

Each of the catalyst layers was used to carry out a test for confirming the generation of nitrogen under the conditions described below. The composition of a test lean gas used under the lean conditions was 2000 ppm of NO, 9% by volume of oxygen and the balance of helium. A test rich gas used under the rich conditions was prepared by injecting 5% by volume of hydrogen into the test gas used under the lean conditions periodically. The gas was forced to pass the catalyst layer with a lean/rich span of 120/30 (s/s) and the gas after the reaction was subject to measurement of nitrogen and NOx by using a quadrupole mass spectrometer (OMNISTAR, manufactured by Balzer Inc.).

FIG. 1 shows the results obtained when the test gas was treated with the catalyst layer formed of the catalyst of the invention. It was confirmed that nitrogen was generated under the lean conditions over a temperature range of 250 to 400° C. This means that the ammonia generated on the catalyst was adsorbed onto a solid acid component in the catalyst under the rich conditions and the thus adsorbed ammonia reduces NOx selectively to nitrogen only under the lean conditions. On the other hand, NOx was adsorbed on the catalyst component A after the generation of nitrogen has ceased so that substantially no NOx was observed in the gas after the reaction under almost all the lean conditions.

In contrast, as FIG. 2 shows the results obtained when the test gas was treated with the catalyst layer formed of the catalyst of Comparative Example, it was confirmed that nitrogen was generated only immediately after the test gas atmosphere was changed from the lean conditions to the rich conditions over a temperature range of 250 to 400° C. This means that the $NO_2$ absorbed in an alkaline compound (NOx absorber) is reduced under the rich conditions only with a reducing agent present in the gas. On the other hand, NOx was adsorbed on the catalyst under the lean conditions so that NOx was not observed in the gas that has passed the catalyst layer at an initial stage of the lean conditions, but it was observed that the amount of NOx in the gas increased gradually after breakthrough of the catalyst layer. This is because it is necessary that the alkaline compound (NOx absorber) absorbs NOx over the entire period under the lean conditions and hence the catalyst layer of Comparison Example needs more adsorption amount than the catalyst layer of the invention

The invention claimed is:

1. A method for catalytic reduction of nitrogen oxides contained in exhaust gases wherein fuel is supplied and subjected to combustion under periodic rich/lean conditions and the resulting exhaust gases are brought into contact with a catalyst, which catalyst comprises:
(A) a catalyst component A which comprises
   (c) ceria or
   (d) praseodymium oxide or
   (e) an oxide and/or a composite oxide of at least two elements selected from the group consisting of cerium, zirconium, praseodymium, neodymium, terbium, samarium, gadolinium and lanthanum;
(B) a catalyst component B which comprises
   (d) a noble metal catalyst component selected from the group consisting of platinum, rhodium, palladium and oxides thereof and
   (e) a carrier; and
(C) a catalyst component C which comprises
   (f) a solid acid, and
   (g) a solid acid supporting an oxide of at least one element selected from the group consisting of vanadium, tungsten, molybdenum, copper, iron, cobalt, nickel and manganese.

2. A method as claimed in claim 1 wherein the catalyst component A supports thereon at least one noble metal catalyst component selected from the group consisting of platinum, rhodium, palladium and oxides thereof.

3. A method for catalytic reduction of nitrogen oxides contained in exhaust gases wherein fuel is supplied and subjected to combustion under periodic rich/lean conditions and the resulting exhaust gases are brought into contact with a catalyst, which catalyst comprises:
an outer catalyst layer comprising a catalyst component A and a catalyst component C, as an outer catalyst component, wherein the catalyst component A comprises
(A) (a) ceria or
   (b) praseodymium oxide or
   (c) an oxide and/or a composite oxide of at least two elements selected from the group consisting of cerium, zirconium, praseodymium, neodymium, terbium, samarium, gadolinium and lanthanum; and
the catalyst component C comprises
(C) (f) a solid acid, and
   (g) a solid acid supporting an oxide of at least one element selected from the group consisting of vanadium, tungsten, molybdenum, copper, iron, cobalt, nickel and manganese; and
an inner catalyst layer comprising a catalyst component B, as an inner catalyst component, wherein the catalyst component B comprises (B) (d) a noble metal catalyst component selected from the group consisting of platinum, rhodium, palladium and oxides thereof and
(e) a carrier.

4. A method as claimed in claim 3 wherein the catalyst component A supports thereon at least one noble metal catalyst component selected from the group consisting of platinum, rhodium, palladium and oxides thereof.

5. A method for catalytic reduction of nitrogen oxides contained in exhaust gases wherein fuel is supplied and subjected to combustion under periodic rich/lean conditions and the resulting exhaust gases are brought into contact with a catalyst, which catalyst comprises:
an outer catalyst layer comprising a catalyst component A and a catalyst component C, as an outer catalyst component, wherein the catalyst component A comprises
(A) (a) ceria or
(b) praseodymium oxide or
(c) an oxide and/or a composite oxide of at least two elements selected from the group consisting of cerium, zirconium, praseodymium, neodymium, terbium, samarium, gadolinium and lanthanum; and
the catalyst component C comprises
(C) (f) a solid acid, and
(g) a solid acid supporting an oxide of at least one element selected from the group consisting of vanadium, tungsten, molybdenum, copper, iron, cobalt, nickel and manganese; and
an inner catalyst layer comprising a catalyst component A and a catalyst component C, as an inner catalyst component, wherein the catalyst component A comprises
(A) (a) ceria or
(b) praseodymium oxide or
(c) an oxide and/or a composite oxide of at least two elements selected from the group consisting of cerium, zirconium, praseodymium, neodymium, terbium, samarium, gadolinium and lanthanum; and
the catalyst component B comprises
(B) (d) a noble metal catalyst component selected from the group consisting of platinum, rhodium, palladium and oxides thereof and
(e) a carrier.

6. A method as claimed in claim 5 wherein at least one of the catalyst component A in the outer catalyst component and the catalyst component A in the inner catalyst component supports thereon at least one noble metal catalyst component selected from the group consisting of platinum, rhodium, palladium and oxides thereof.

7. A method for catalytic reduction of nitrogen oxides contained in exhaust gases wherein fuel is supplied and subjected to combustion under periodic rich/lean conditions and the resulting exhaust gases are brought into contact with a catalyst structure, in which the catalyst structure comprises an inactive substrate and the catalyst as claimed in claim 1.

8. A method for catalytic reduction of nitrogen oxides contained in exhaust gases wherein fuel is supplied and subjected to combustion under periodic rich/lean conditions and the resulting exhaust gases are brought into contact with a catalyst structure, in which the catalyst structure comprises an inactive substrate and the catalyst as claimed in claim 3.

9. A method for catalytic reduction of nitrogen oxides contained in exhaust gases wherein fuel is supplied and subjected to combustion under periodic rich/lean conditions and the resulting exhaust gases are brought into contact with a catalyst structure, in which the catalyst structure comprises an inactive substrate and the catalyst as claimed in claim 2.

10. A method for catalytic reduction of nitrogen oxides contained in exhaust gases wherein fuel is supplied and subjected to combustion under periodic rich/lean conditions and the resulting exhaust gases are brought into contact with a catalyst structure, in which the catalyst structure comprises an inactive substrate and the catalyst as claimed in claim 4.

11. A method for catalytic reduction of nitrogen oxides contained in exhaust gases wherein fuel is supplied and subjected to combustion under periodic rich/lean conditions and the resulting exhaust gases are brought into contact with a catalyst structure, in which the catalyst structure comprises an inactive substrate and the catalyst as claimed in claim 5.

12. A method for catalytic reduction of nitrogen oxides contained in exhaust gases wherein fuel is supplied and subjected to combustion under periodic rich/lean conditions and the resulting exhaust gases are brought into contact with a catalyst structure, in which the catalyst structure comprises an inactive substrate and the catalyst as claimed in claim 6.

13. A catalyst for catalytic reduction of nitrogen oxides contained in exhaust gases wherein fuel is supplied and subjected to combustion under periodic rich/lean conditions and the resulting exhaust gases are brought into contact therewith, which catalyst comprises:
(A) a catalyst component A comprising
(c) ceria or
(d) praseodymium oxide or
(e) an oxide and/or a composite oxide of at least two elements selected from the group consisting of cerium, zirconium, praseodymium, neodymium, terbium, samarium, gadolinium and lanthanum;
(B) a catalyst component B comprising
(d) a noble metal catalyst component selected from the group consisting of platinum, rhodium, palladium and oxides thereof and
(e) a carrier; and
(C) a catalyst component C comprising
(f) a solid acid, and
(g) a solid acid supporting an oxide of at least one element selected from the group consisting of vanadium, tungsten, molybdenum, copper, iron, cobalt, nickel and manganese.

14. A catalyst as claimed in claim 13 wherein the catalyst component A supports thereon at least one noble metal catalyst component selected from the group consisting of platinum, rhodium, palladium and oxides thereof.

15. A catalyst for catalytic reduction of nitrogen oxides contained in exhaust gases wherein fuel is supplied and subjected to combustion under periodic rich/lean conditions and the resulting exhaust gases are brought into contact therewith, which catalyst comprises:
an outer catalyst layer comprising a catalyst component A and a catalyst component C, as an outer catalyst component, wherein the catalyst component A comprises
(A) (a) ceria or
(b) praseodymium oxide or
(c) an oxide and/or a composite oxide of at least two elements selected from the group consisting of cerium, zirconium, praseodymium, neodymium, terbium, samarium, gadolinium and lanthanum; and
the catalyst component C comprises
(C) (f) a solid acid, and
(g) a solid acid supporting an oxide of at least one element selected from the group consisting of vanadium, tungsten, molybdenum, copper, iron, cobalt, nickel and manganese; and an inner catalyst layer comprising a catalyst component B, as an inner catalyst component, wherein the catalyst component B comprises (B) (d) a noble metal catalyst component selected from the group consisting of platinum, rhodium, palladium and oxides thereof and
(e) a carrier.

16. A catalyst as claimed in claim 15 wherein the catalyst component A supports thereon at least one noble metal catalyst component selected from the group consisting of platinum, rhodium, palladium and oxides thereof.

17. A catalyst for catalytic reduction of nitrogen oxides contained in exhaust gases wherein fuel is supplied and subjected to combustion under periodic rich/lean conditions and the resulting exhaust gases are brought into contact therewith, which catalyst comprises:

an outer catalyst layer comprising a catalyst component A and a catalyst component C, as an outer catalyst component, wherein the catalyst component A comprises
(A) (a) ceria or
(b) praseodymium oxide or
(c) an oxide and/or a composite oxide of at least two elements selected from the group consisting of cerium, zirconium, praseodymium, neodymium, terbium, samarium, gadolinium and lanthanum; and
the catalyst component C comprises
(C) (f) a solid acid, and
(g) a solid acid supporting an oxide of at least one element selected from the group consisting of vanadium, tungsten, molybdenum, copper, iron, cobalt, nickel and manganese; and
an inner catalyst layer comprising a catalyst component A and a catalyst component C, as an inner catalyst component, wherein the catalyst component A comprises
(A) (a) ceria or
(b) praseodymium oxide or
(c) an oxide and/or a composite oxide of at least two elements selected from the group consisting of cerium, zirconium, praseodymium, neodymium, terbium, samarium, gadolinium and lanthanum; and
the catalyst component B comprises
(B) (d) a noble metal catalyst component selected from the group consisting of platinum, rhodium, palladium and oxides thereof and
(e) a carrier.

18. A catalyst as claimed in claim 17 wherein at least one of the catalyst component A in the outer catalyst component and the catalyst component A in the inner catalyst component supports thereon at least one noble metal catalyst component selected from the group consisting of platinum, rhodium, palladium and oxides thereof.

19. A catalyst structure for catalytic reduction of nitrogen oxides contained in exhaust gases wherein fuel is supplied and subjected to combustion under periodic rich/lean conditions and the resulting exhaust gases are brought into contact therewith, in which the catalyst structure comprises an inactive substrate and the catalyst as claimed in claim 13.

20. A catalyst structure for catalytic reduction of nitrogen oxides contained in exhaust gases wherein fuel is supplied and subjected to combustion under periodic rich/lean conditions and the resulting exhaust gases are brought into contact therewith, in which the catalyst structure comprises an inactive substrate and the catalyst as claimed in claim 15.

21. A catalyst structure for catalytic reduction of nitrogen oxides contained in exhaust gases wherein fuel is supplied and subjected to combustion under periodic rich/lean conditions and the resulting exhaust gases are brought into contact therewith, in which the catalyst structure comprises an inactive substrate and the catalyst as claimed in claim 14.

22. A catalyst structure for catalytic reduction of nitrogen oxides contained in exhaust gases wherein fuel is supplied and subjected to combustion under periodic rich/lean conditions and the resulting exhaust gases are brought into contact therewith, in which the catalyst structure comprises an inactive substrate and the catalyst as claimed in claim 16.

23. A catalyst structure for catalytic reduction of nitrogen oxides contained in exhaust gases wherein fuel is supplied and subjected to combustion under periodic rich/lean conditions and the resulting exhaust gases are brought into contact therewith, in which the catalyst structure comprises an inactive substrate and the catalyst as claimed in claim 17.

24. A catalyst structure for catalytic reduction of nitrogen oxides contained in exhaust gases wherein fuel is supplied and subjected to combustion under periodic rich/lean conditions and the resulting exhaust gases are brought into contact therewith, in which the catalyst structure comprises an inactive substrate and the catalyst as claimed in claim 18.

* * * * *